(No Model.)

L. P. GARCIN.
DOVETAILING MACHINE.

No. 331,491. Patented Dec. 1, 1885.

Witnesses:

Inventor
L. P. Garcin
By Dewey & Co.
Attorneys

UNITED STATES PATENT OFFICE.

LEONPAUL P. GARCIN, OF SAN FRANCISCO, CALIFORNIA.

DOVETAILING-MACHINE.

SPECIFICATION forming part of Letters Patent No. 331,491, dated December 1, 1885.

Application filed August 26, 1885. Serial No. 175,397. (No model.)

*To all whom it may concern:*

Be it known that I, LEONPAUL P. GARCIN, of the city and county of San Francisco, State of California, have invented an Improvement in Dovetail-Machines; and I hereby declare the following to be a full, clear, and exact description of the same.

My invention relates to an apparatus which is especially applicable to cutting dovetailed grooves in the edges or sides of strips of wood.

It consists of a saw or cutter the arbor of which is journaled in a frame, said frame swinging about trunnions fixed to a plate or table over which the article to be dovetailed passes, and these trunnions form the center from which the sides of the dovetailed cut diverge. The arbor is adjustable on its frame to vary the depth of the cut.

Figure 1:
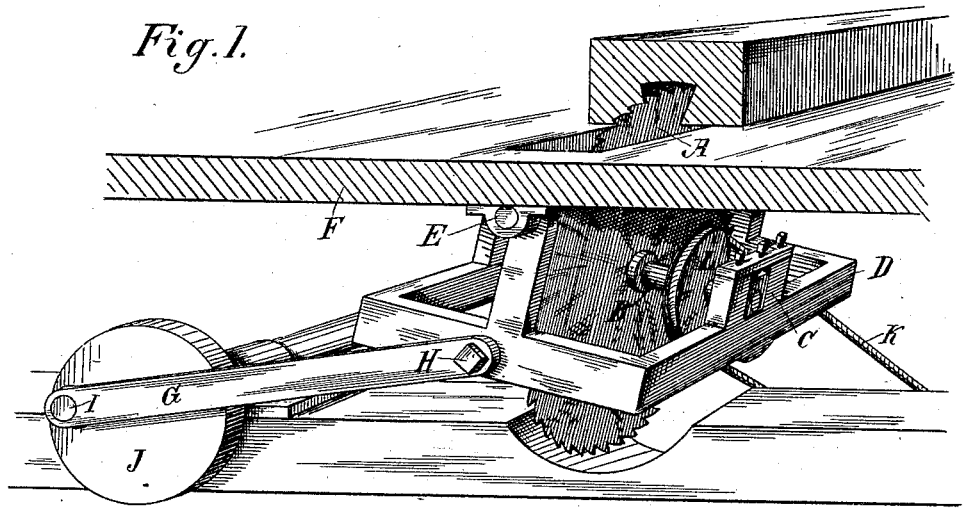
Figure 2:
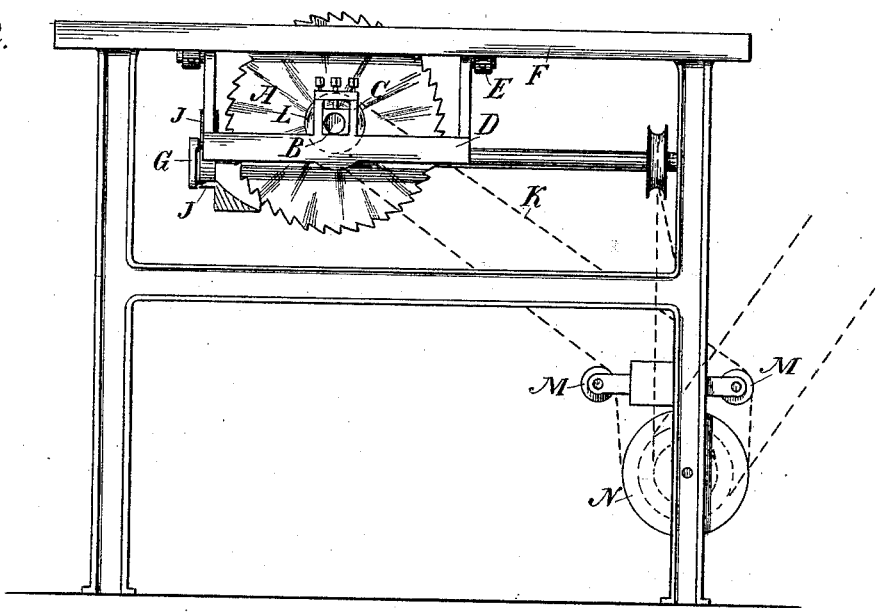

Referring to the accompanying drawings for a more complete explanation of my invention, Figure 1 is a perspective view of the apparatus, showing the cutter with a portion of the frame-work broken away. Fig. 2 is a side elevation.

A is the cutter, which in the present instance is represented by a saw mounted upon an arbor, B, which is journaled in boxes C, fitted in vertical slots on the sides of the frame D. By means of these boxes, moving in the slots, and adjusting-screws they may be moved up or down at will so as to raise or lower the cutter, and thus increase or decrease the depth of the cut made upon it. The frame D has trunnions E at a point considerably above the plane of the saw-arbor, and these trunnions are journaled in boxes which are secured below the table F, over which the material to be operated upon passes. The frame D is caused to oscillate or reciprocate about these trunnions by means of a pitman, G, one end of which is connected with a pin, H, upon the frame D, near a line below the trunnions, as shown. The other end of this pitman is connected with a pin, I, upon a disk or crank wheel, J, which is driven by suitable mechanism connected with the shaft upon which it is fixed. This crank-wheel may be slotted so that the pin I can be moved nearer to or farther from the center, so as to decrease or increase the length of the stroke. The action of this mechanism will be to produce an oscillation of the frame D and the cutter about the trunnions E, and this causes the upper edge of the cutter, which passes through the table, to move from side to side about the trunnions as a center.

The cutter is caused to rotate by a belt, K, which passes around a pulley, L, upon the saw-arbor, and this causes the saw or cutter to be rotated, while at the same time it is oscillated from side to side. The effect of this movement will be to cut a dovetailed groove in any piece of timber which may be passed over the cutter, the bottom of the groove being in the form of a small arc, instead of plain or horizontal.

The belt K passes over direction-pulleys M, fixed at convenient points upon the table or frame-work, and thence it passes around the driving-pulley N, as shown. The pulleys M and N are at such a distance from the pulley L that the swinging motion of the cutter and its frame does not materially influence the belt.

Having thus described my invention, what I claim as new, and desire to secure by Letters Patent, is—

1. An apparatus for cutting dovetailed slots, comprising a cutter or saw mounted in a frame which is journaled in bearings and oscillates automatically below the table over which the work passes, the edge of the cutter extending up through the table, substantially as herein described.

2. In an apparatus for cutting dovetailed grooves or slots, the saw or cutter mounted upon an arbor which is journaled in a frame swinging on trunnions beneath the table, and a pitman and crank-wheel through which an oscillating motion is communicated to the frame, substantially as herein described.

3. In an apparatus for cutting dovetailed slots, a frame suspended beneath the table upon trunnions, a saw or cutter mounted upon an arbor at right angles to and below the plane of the trunnions, a belt-pulley or means by which the cutter is caused to rotate, and a pitman connecting the oscillating frame with a crank-wheel, substantially as herein described.

4. In an apparatus for cutting dovetailed slots or channels, a frame suspended upon trunnions beneath the table, and a means for oscillating said frame about the trunnions, in combination with a saw or cutter mounted upon an arbor at right angles with and below the trunnions, journal-boxes in the sides of the frame, in which the ends of the arbor turn, and a means for raising and depressing said boxes on the frame so as to raise or depress the edge of the saw above the table and vary the depth of the cut, substantially as herein described.

In witness whereof I have hereunto set my hand.

LEONPAUL P. GARCIN.

Witnesses:
S. H. NOURSE,
H. C. LEE.